M. MOSLER & C. BARTELS.
PLATE SECURING METHOD.
APPLICATION FILED MAY 18, 1916.
1,201,608.
Patented Oct. 17, 1916.
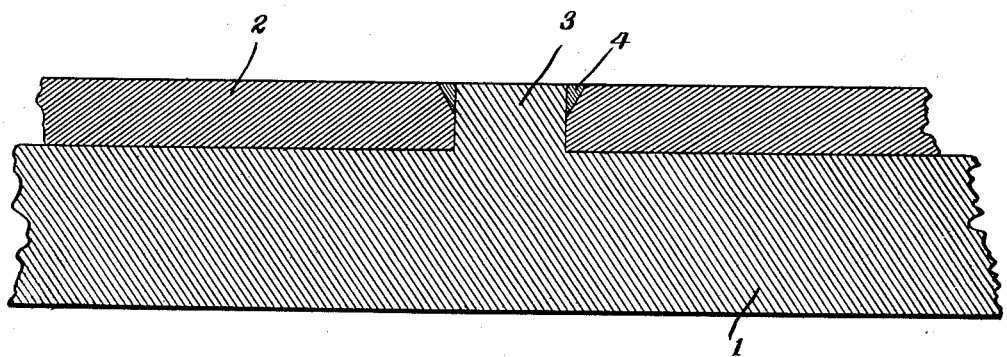
Witness:
Geo. Johnson
Moses Mosler
Carl Bartels
Inventors
by James W. See
Attorney

UNITED STATES PATENT OFFICE.

MOSES MOSLER, OF CINCINNATI, AND CARL BARTELS, OF HAMILTON, OHIO, ASSIGNORS TO THE MOSLER SAFE COMPANY, OF NEW YORK, N. Y.

PLATE-SECURING METHOD.

1,201,608.   Specification of Letters Patent.   Patented Oct. 17, 1916.

Application filed May 18, 1916. Serial No. 98,444.

*To all whom it may concern:*

Be it known that we, MOSES MOSLER, a citizen of the United States, residing at Cincinnati, Hamilton county, Ohio, and CARL BARTELS, a citizen of the United States, residing at Hamilton, Butler county, Ohio, have invented certain new and useful Improvements in Plate-Securing Methods, of which the following is a specification.

In the securing of metallic plates facewise to each other, as in the manufacture of the walls and doors of safes, it has been usual to secure the plates together by means of screws or bolts or rivets. In some combinations of plates employed in the construction of the doors and walls of safes, one or more of the plates may be of unmachineable metal, such as manganese steel castings, or one or more of the plates may be unpunchable and undrillable, as is the case with some of the laminated plates employed in safe construction, and in many cases in safe construction it becomes desirable to secure a plate of machineable metal, such as ordinary steel, against the face of a plate of unmachineable metal, such as manganese casting. Our method lends itself to any of the combinations of plates which have been referred to and will be readily understood from the following description taken in connection with the accompanying drawing which is a section through two plates united by a method exemplifying our invention.

In the drawing:—1, indicates a plate, which may be assumed as being of unmachineable metal, such as manganese steel castings: 2, a second plate which is to be united flatwise against the first plate, and this second plate may be assumed as being of machineable metal, such, for instance, as ordinary steel; 3, a stud secured to one of the plates and projecting through a suitable perforation in the other plate: and 4, metal surrounding the stud and welded to the stud and to the wall of the perforation.

In the illustrated example the stud 3 is an integral part of one of the plates, and the illustrated combination of plates is designed to produce a composite structure having one of its faces formed of unmachineable metal and the other face formed of machineable metal, such composite plate-structure being of great utility in safe-construction where it is desired to produce a wall having an impenetrable exterior and having an interior of such character that it may be drilled, tapped, etc., for the attachment of accessories.

In uniting two plates in accordance with our improved method, the plates are laid together with the studs engaging the perforations, and it is highly desirable that the perforations at the ends of the studs be liberally countersunk. There is then taken in hand a metallic wire of such size as when fused, to fill the countersink around a stud, and to the end of this wire is applied the welding flame of a welding torch, such as an oxy-acetylene welding torch, and this welding operation is carried around the stud until the metal of the wire has been welded to the stud and to the wall of the aperture surrounding it. Instead of a welding torch the welding may be done electrically by passing an electric current through the wire to the stud or perforated plate. The result, regardless of whether the welding be done by an electric current or the flame of a welding-torch, is that a portion of the stud is welded to the perforated plate in which the stud is seated. In the exemplifying drawing the metal 4 is llustrated as being defined by inner and outer lines, but it is to be understood that when the welding has been completed this metal is homogeneous with the plate-metal which surrounds it and with the stud which it surrounds.

We claim:—

The improved method for securing two plates together face to face, which consists in providing a first plate with an integrally formed stud projecting from one of its faces and having a length equal to the thickness of a second plate which is to be joined to the first plate, providing the second plate with a hole fitting upon said stud and countersunk at the outer surface of the plate, and welding metal into said countersink in welded union with the exterior of the stud and the interior of the countersink, combined substantially as set forth.

MOSES MOSLER.
CARL BARTELS.

Witnesses:
HENRY G. MOSLER,
PAUL KURRY.